United States Patent [19]
Lin et al.

[11] Patent Number: 6,087,848
[45] Date of Patent: Jul. 11, 2000

[54] BACKPLANE CONNECTOR APPARATUS AND METHOD

[75] Inventors: Jung-Chen Lin; Lawerence W. Mo, both of Cupertino, Calif.

[73] Assignee: Kendin Semiconductor, Inc., Sunnyvale, Calif.

[21] Appl. No.: 09/119,298

[22] Filed: Jul. 20, 1998

[51] Int. Cl.[7] .................................................. H03K 17/16
[52] U.S. Cl. ........................ 326/30; 333/101; 333/22 R
[58] Field of Search ................................. 326/30, 86, 90, 326/82; 333/101, 103, 22 R; 439/74, 76, 928

[56] References Cited

U.S. PATENT DOCUMENTS

| | | | |
|---|---|---|---|
| 5,645,434 | 7/1997 | Leung | 439/74 |
| 5,961,619 | 10/1999 | Voloshin | 710/101 |

*Primary Examiner*—Michael Tokar
*Assistant Examiner*—Anh Tran
*Attorney, Agent, or Firm*—Wilson, Sonsini, Goodrich & Rosati

[57] ABSTRACT

Systems and methods are described for implementing a backplane in the context of a stack of networking hubs based on a backplane connecter and for carrying out a method of configuring and terminating the backplane. A backplane connector includes a first voltage source; a plurality of connector contacts; a plurality of termination resistors, a first end of the plurality of termination resistors being coupled to the plurality of connector contacts; a first switch located between the first voltage source and a second end of the plurality of termination resistors; a first logic circuit coupled to the first switch, the first logic circuit closing the first switch when a layer composed by the backplane connector is both i) active and ii) either a top layer in a stack composed by the layer or a bottom layer in the stack. The systems and methods provide advantages in that a plurality of stackable network hubs can be economically coupled together with automatic impedance matching and the ability to power down one or more layers in a stack without disrupting data flow between other layers in the stack.

21 Claims, 4 Drawing Sheets

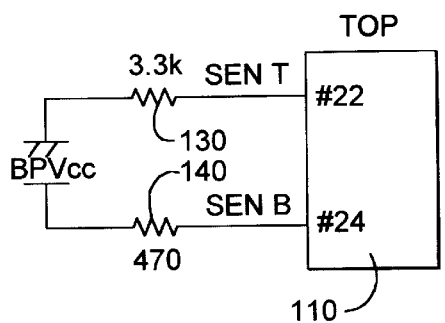
FIG. 1A
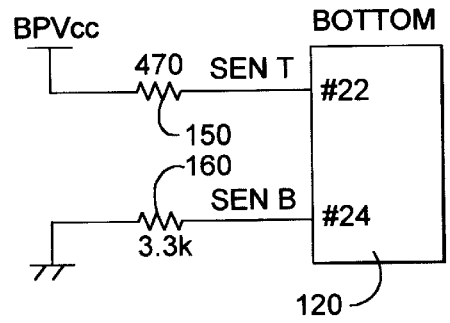
FIG. 1B
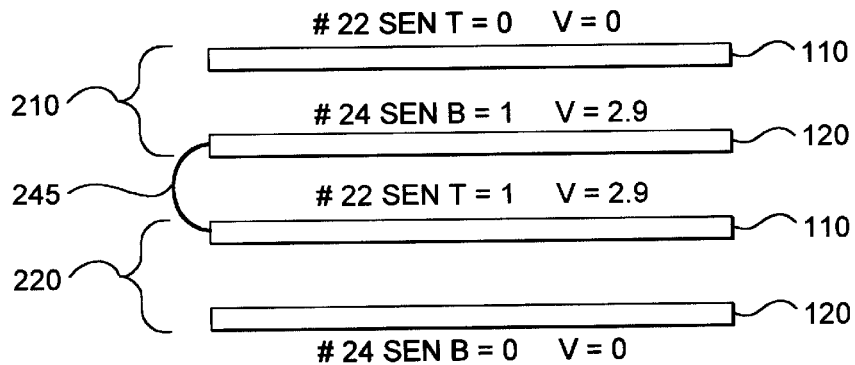
FIG. 2
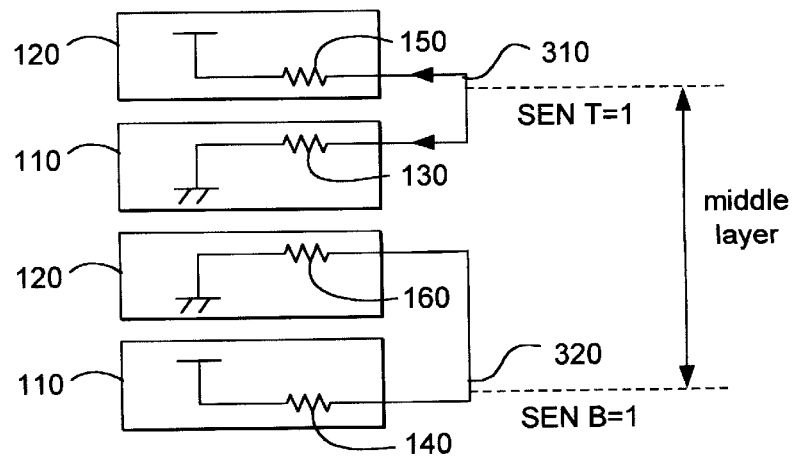
FIG. 3A
FIG. 3B ously satisfy the above-discussed requirements of automatic impedance matching, powering down one or more layers in a stack without disrupting data flow between other layers in the stack, and economical implementation, which, in the case of the prior art, are mutually contradicting and cannot be simultaneously satisfied.

BACKPLANE CONNECTOR APPARATUS AND METHOD

BACKGROUND OF THE INVENTION

1. Field of the Invention

The invention relates generally to the field of stackable networking hubs. More particularly, the invention relates to supporting a backplane defined by a stack of networking hubs.

2. Discussion of the Related Art

Prior art networking hubs, sometimes called matrix switches, are known to those skilled in the art. For example, a conventional networking hub is typically stacked with one or more similar hubs to incrementally expand a local area network (LAN).

A problem with this stackable hub technology has been the top layer and the bottom layer in a stack of networking hubs has a different impedance than the middle layers. This impedance mismatch can cause reflection and lose of signal integrity. It is known to couple a terminating resistance to the top and bottom layers in the stack so as to avoid any impedance mismatch. In the past, when a stack is reconfigured, for example via the attachment of one or more additional layers, reconfiguration of the terminating resistance has required skilled personnel and/or complex equipment. Therefore, what is required is a simple solution that automatically reconfigures the terminating resistance.

Another problem with stackable hub technology has been that powering down a layer in a stack of networking hubs can cause an interruption of data flow between other layers in the stack. A stack of networking hubs can include one, or more, unused layers due to fact that under a particular set of circumstances all of the nodes connected to a given layer are not being used or due to the installation of future expansion capacity. If a stack of hubs includes one or more unused layers, it may be desirable to power down the unused hubs. Powering down an unused layer can reduce power consumption and thermal emission. Therefore, what is also required is a solution that provides continuation of data flow between the active layers of a stack, even when one or more other layers in the stack are not powered up.

What is also needed is a solution that is economical to implement. Heretofore, the requirements of automatic impedance matching, powering down one or more layers in a stack without disrupting data flow between other layers in the stack, and economical implementation have not been fully met. What is needed is a solution that simultaneously addresses all of these requirements.

SUMMARY OF THE INVENTION

A primary object of the invention is to provide a simple approach to automatically identifying a layer in a stack of networking hubs as either a top layer, a middle layer, or a bottom layer and, in the case of the top layer or the bottom layer, automatically applying an impedance matching termination. Another primary object of the invention is to provide a simple approach to powering down one or more layers in the stack of networking hubs without affecting the other layers in the stack.

In accordance with these objects, there is a particular need for a backplane defined by the interconnections within a stack of networking hubs that identifies each of the individual layers in a stack as a top layer, a middle layer, or a bottom layer and couples an impedance matching termination resistance to both a top connector of the top layer and a bottom connector of the bottom layer. Similarly, there is also a particular need for a backplane defined by the interconnections within a stack of networking hubs that decouples both the top and bottom connectors of one or more inactive layers from the backplane without disrupting data flow between the active layers in the stack. Thus, it is rendered possible to simultaneously satisfy the above-discussed requirements of automatic impedance matching, powering down one or more layers in a stack without disrupting data flow between other layers in the stack, and economical implementation, which, in the case of the prior art, are mutually contradicting and cannot be simultaneously satisfied.

A first aspect of the invention is implemented in an embodiment that is based on a backplane connector comprising a first voltage source; a plurality of connector contacts; a plurality of termination resistors, a first end of said plurality of termination resistors being coupled to said plurality of connector contacts; a first switch located between said first voltage source and a second end of said plurality of termination resistors; a first logic circuit coupled to said first switch, said first logic circuit closing said first switch when a layer composed by said backplane connector is both i) active and ii) either a top layer in a stack composed by said layer or a bottom layer in said stack. A second aspect of the invention is implemented in an embodiment that is based on a backplane defined by electrical interconnections between a plurality of layers, comprising: a top layer including a top layer top connector and a top layer bottom connector; and a bottom layer electrically coupled to said top layer, said bottom layer including a bottom layer top connector and a bottom layer bottom connector. A third aspect of the invention is implemented in an embodiment that is based on a method of terminating a backplane defined by electrical interconnections between a plurality of layers, said method comprising: detecting a top layer among said plurality of layers, said top layer including a top backplane connector having a plurality of connector contacts; and coupling a plurality of terminating resistors to said plurality of connector contacts.

These, and other, objects and aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters (if they occur in more than one view) designate the same parts. It should be noted that the features illustrated in the drawings are not necessarily drawn to scale.

FIG. 1A illustrates an electrical schematic view of a top connector of a first layer, representing an embodiment of the invention.

FIG. 1B illustrates an electrical schematic view of a bottom connector of the first layer, representing an embodiment of the invention.

FIG. 2 illustrates a block schematic view of two layers electrically connected with a SCSI cable, representing an embodiment of the invention.

FIG. 3A illustrates an electrical schematic view of a SEN T line between a bottom connector of a top layer and a top connector of a bottom layer, representing an embodiment of the invention.

FIG. 3B illustrates an electrical schematic view of a SEN B line between the bottom connector of the top layer and the top connector of the bottom layer, representing an embodiment of the invention.

DESCRIPTION OF PREFERRED EMBODIMENTS

Figure 4:
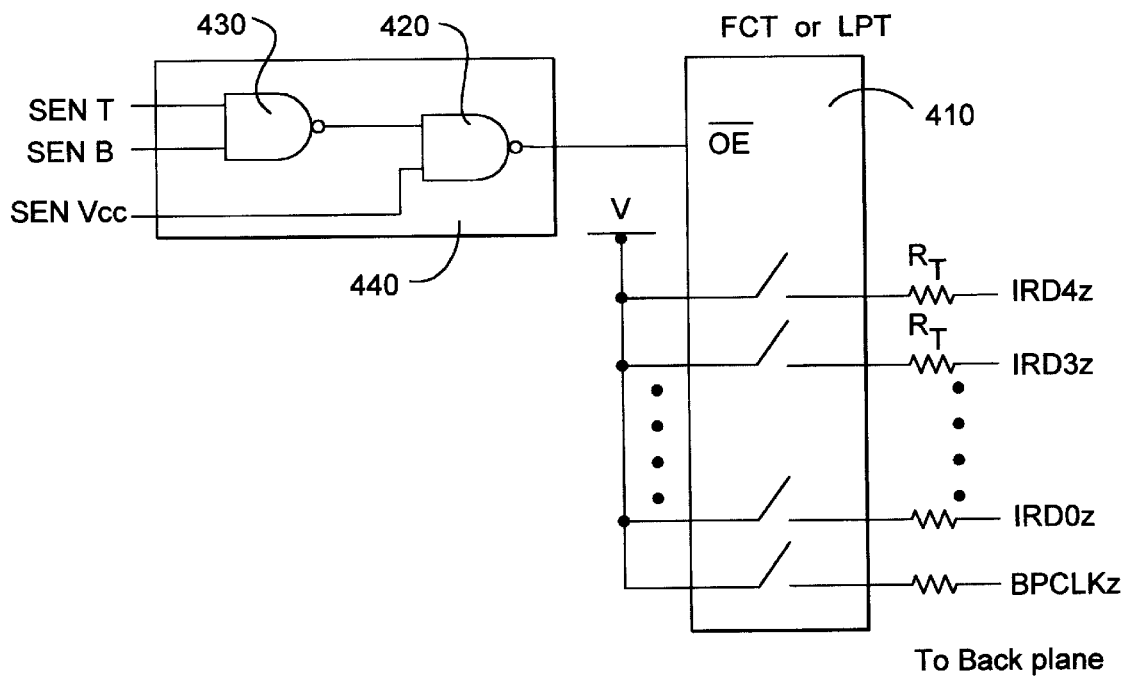
FIG. 4 illustrates an electrical schematic view of a circuit for evaluating the state of a given layer and optionally coupling each signal line to a termination resistor, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail.

The context of the invention can be a stack of network hubs. With regard to a single hub, the context of the invention can be an integrated repeater, on the board side. The invention can also utilize data processing methods that transform the signals being transferred by the backplane so as to actuate interconnected discrete hardware elements, such as, for example, switches.

1. Control Signals for backplane

The backplane is defined by the interconnection(s) between a plurality of networking hubs. Each of the hubs can be termed a layer. Together, a plurality of hubs compose a stack. In a stack, a layer that is connected to only one other layer is either a top layer or a bottom layer. The control signals for the backplane include:

BPCOL +
BACT0 +
BACT1 +
BACT2 +
BACT3 +
BACT4 +and
BACT5 +.

2. Backplane signals (Data and Clock)

In addition to control signals, the backplane transfers data and clock signals. The data and clock signals include:

IRD0Z
IRD1Z
IRD2Z
IRD3Z
IRD4Z and
BPCLKZ.

The data and clock signals need to be terminated at the top and bottom layers only.

3. Backplane Connector

The backplane connector can be, for example, a 50 pin SCSI connector or a 25 pin parallel port connector. In general, a SCSI connector can achieve higher performance. Each layer will have two connectors. A first connector to connect to the layer above, called the top connector, and a second connector to connect to the layer below, called the bottom connector. For a top layer in a stack, the top connector is not connected to any layer. Similarly, for the bottom layer in a stack, the bottom connector is left open.

Referring to FIGS. 1A and 1, a top connector 110 and a bottom connector 120 of a single layer (hub) are shown, respectively. A simple circuit can be used to sense whether the single layer is a top layer, a bottom layer, or a middle layer. For this purpose, any two pins at the connectors 110, 120 can be chosen, for example, #22 and #24.

Referring to FIG. 1A, pin #22 of the top connector 110 is connected to ground via a first resistor 130 (e.g., 3300 ohm). The voltage level of pin #22 is represented by SEN T (sense top). Pin #24 of the top connector 110 is connected to BPVcc (backplane voltage) via a second resistor 140 (e.g., 470 ohm).

Referring to FIG. 1B, pin #22 of the bottom connector 120 is connected to BPVcc via a third resistor 150 (e.g., 470 Ohm). Pin #24 of the bottom connector 120 is connected to ground via a fourth resistor 160 (e.g., 3300 ohm). The voltage level of pin #24 is represented by SEN B (sense bottom).

Referring now to FIG. 2, a top layer 210 coupled to a bottom layer 220 is depicted. The bottom connector 120 of the top layer 210 is electrically coupled to the top connector 110 of the bottom layer 220 with a SCSI cable 245. The top connector 110 of the top layer 210 is not connected. Similarly, the bottom connector 120 of the bottom layer 220 is not connected.

Still referring to FIG. 2, for the top layer 210, SEN T=0 (logic low) because pin #22 of the top connector 110 is not connected. For the top layer 210, SEN B=1 (logic high) as a result of a resistor divider that includes a 3.3 Kohm resistor located within the bottom connector 120 of the top layer 210 and a 470 ohm resistor located within the top connector 110 of the bottom layer 220. The voltage level of SEN B of the bottom connector 120 of the 15 top layer 210 can be represented by $$SEN\ B = \frac{3.3K}{3.3K + 470n} \times BPVcc \simeq .87BPVcc$$

where BPVcc is the backplane voltage. Thus, the top layer 210 is identified by the states $$\begin{cases} SEN\ T = 0 & \text{(logic low)} \\ SEN\ B = 1 & \text{(logic high)} \end{cases}$$

For the bottom layer 220, on the other hand, $$\begin{cases} SEN\ T = 1 & \text{(logic high)} \\ SEN\ B = 0 & \text{(logic low)} \end{cases}$$

Without reference to any particular figure, if there are more than two layers in the stack, the middle layers will be identified by the states SEN T=1 and SEN B=1. Thus, SEN T=0 identifies a top layer and SEN B=0 identifies a bottom layer. Therefore, a way to differentiate top, middle, bottom layers is provided. This information can be used to terminate the important data and check lines in the backplane to reduce reflection and maintain high signal integrity. This is essential in stackable hub designs.

Referring now to FIGS. 3A and 3B, a #22 pin connection 310 and a #24 pin connection 320 are depicted. The #22 pin connection 310 and the #24 pin connection 320 couple the top connector 110 of a first hub and the bottom connector 120 of a second hub.

Referring to FIG. 3A, the #22 pin connection 310 between the bottom connector 120 of the first hub and the top connector 110 of a second hub includes the first resistor 130 and the third resistor 150. The SENT of the #22 pin connection 310 is logic high.

Referring to FIG. 3B, shows the #24 connection 320 between the bottom connector 120 of the first hub and the top connector 110 of the second hub includes the second resistor 140 and the fourth resistor 160. The SEN B of the #24 pin connection 320 is logic high.

Referring now to FIG. 4, a circuit for coupling a termination resistance RT to each of a plurality of signal lines IRD[0–4]Z and BPCLKZ is depicted. RT is the termination resistor for each signal line. The circuit depicted in FIG. 4 can be termed a backplane connector. The backplane connector includes a voltage source V. The voltage source can include a backplane voltage source. The backplane connector also includes a plurality of connector contacts IRD[0–4]Z and BPCLKZ. The plurality of connector contacts IRD[0–4]Z and BPCLKZ can be input/output pins. The backplane connector also includes a plurality of termination resistors RT. A first end of the plurality of termination resistors RT is coupled to the plurality of connector contacts. The backplane connector also includes a switch 410 located between the voltage source V and a second end of the plurality of termination resistors $R_T$. The backplane connector also includes a first circuit 440 coupled to the first switch 410. The logic circuit 440 includes a first logic gate 420 and a second logic gate 430. The first logic gate 420 can have an output coupled to the first switch 410, a first input that carries a signal representing an activity state of the layer SEN Vcc, and a second input that carries an output signal from the second logic gate 430. The second logic gate 430 can include a first input that carries a signal representing a top layer state of the layer SEN T and a second input that carries a signal representing a bottom layer state of the layer SEN B. The first logic circuit 440 closes the first switch 410 when a layer composed by the backplane connector is both i) active and ii) either a top layer in a stack composed by the layer or a bottom layer in the stack.

Still referring to FIG. 4, the two lines of vertical dots in FIG. 4 indicates that the plurality of signal lines can includes any number of lines (e.g., I/O pins). To provide termination for the data and clock lines, an analog switch device such as, for example, a member of the FCT family can be used as the switch 410. Alternatively, a member of the LPT family can be used. The switch 410 can be closed or open depending on the input $\overline{OE}$. The input $\overline{OE}$ is provided by the first logic gate 420. When $\overline{OE}$ is logic high, the switch 410 will be open and the termination resistance $R_T$ will not be coupled. When $\overline{OE}$ is logic low, the switch 410 will be closed and the termination resistance $R_T$ will be coupled. For $\overline{OE}$ to be low, SEN Vcc must be logic high. Vcc itself represents the chip power. SEN Vcc is a logic signal to sense whether the power supply of the hub (layer) is on or off. When the power is off, SEN Vcc=0. When the power is on, SEN Vcc=1. If the layer that includes the switch 410 is active, then SEN Vcc will be logic high (SEN Vcc=1). Being able to shut off the power to an unused hub in a stack provides an advantage in that energy can be conserved.

Still referring to FIG. 4, for $\overline{OE}$ to be low, the signal provided by the second logic gate 430 must also be logic high. For the signal provided by the second logic gate 430 to be logic high, SEN T and SEN B cannot both be logic high. As explained above in more detail, only if the layer that includes the switch 410 is a middle layer will both SEN T and SEN B be logic high. Therefore, if the layer that includes the analog switch device 410 is a top or bottom layer, one of SEN T or SEN B will be logic low, and the signal provided by the second logic gate 430 will be logic high.

Figure 5:
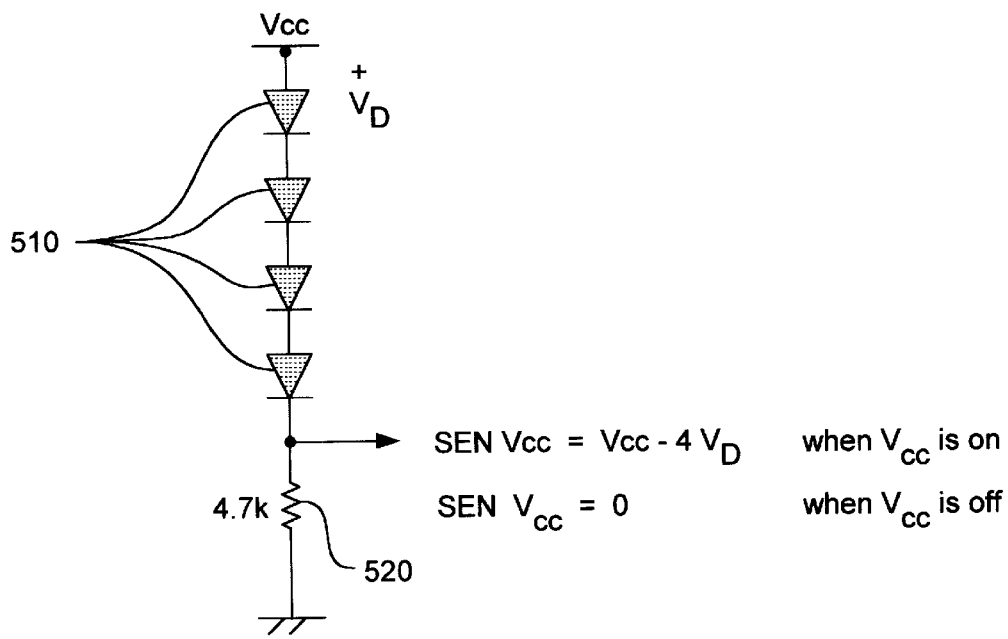
FIG. 5 illustrates an electrical schematic view of a circuit for preventing a false SEN Vcc state reading where BPVcc leaks back into Vcc when the power to the given layer is off, representing an embodiment of the invention.

Referring to FIG. 5, a circuit for transforming (e.g., reducing) Vcc is depicted. It can be desirable to transform Vcc before obtaining SEN Vcc because, as will be explained in more detail below with regard to FIG. 7, BPVcc can leak into an inactive (powered down) layer and keep Vcc at a level above ground, thereby causing a false SEN Vcc reading.

Referring again to FIG. 5, SEN Vcc can be reliably obtained with the use of a plurality of diodes 510 and a resistor 520. Each of the plurality of diodes 510 causes a voltage drop of $V_D$. If an LPT (e.g., 3.3 v) analog switch device is used, four diodes with a $V_D$ of 0.65 volt can be used. (For FCT (5V) devices, more voltage drops are needed.) In the case of LPT devices, if BPVcc leaks back into Vcc when the power to a given layer is off, the apparent Vcc will be at 3.3 v–0.7 v≈2.6 v (the 0.7 v drop being due to the internal diode of the chip). After 4 diode drops from four of the plurality of diodes 510, SEN Vcc will be at 2.6 v–(4×0.65 v)≈0.0 v. This will ensure a SEN Vcc state of logic low.

Without regard to any particular figure, the use of LPT devices can also provide bi-directional features. This is most advantageous for controlling backplane data and clock signals, since they are bi-directional as well.

Figure 6:
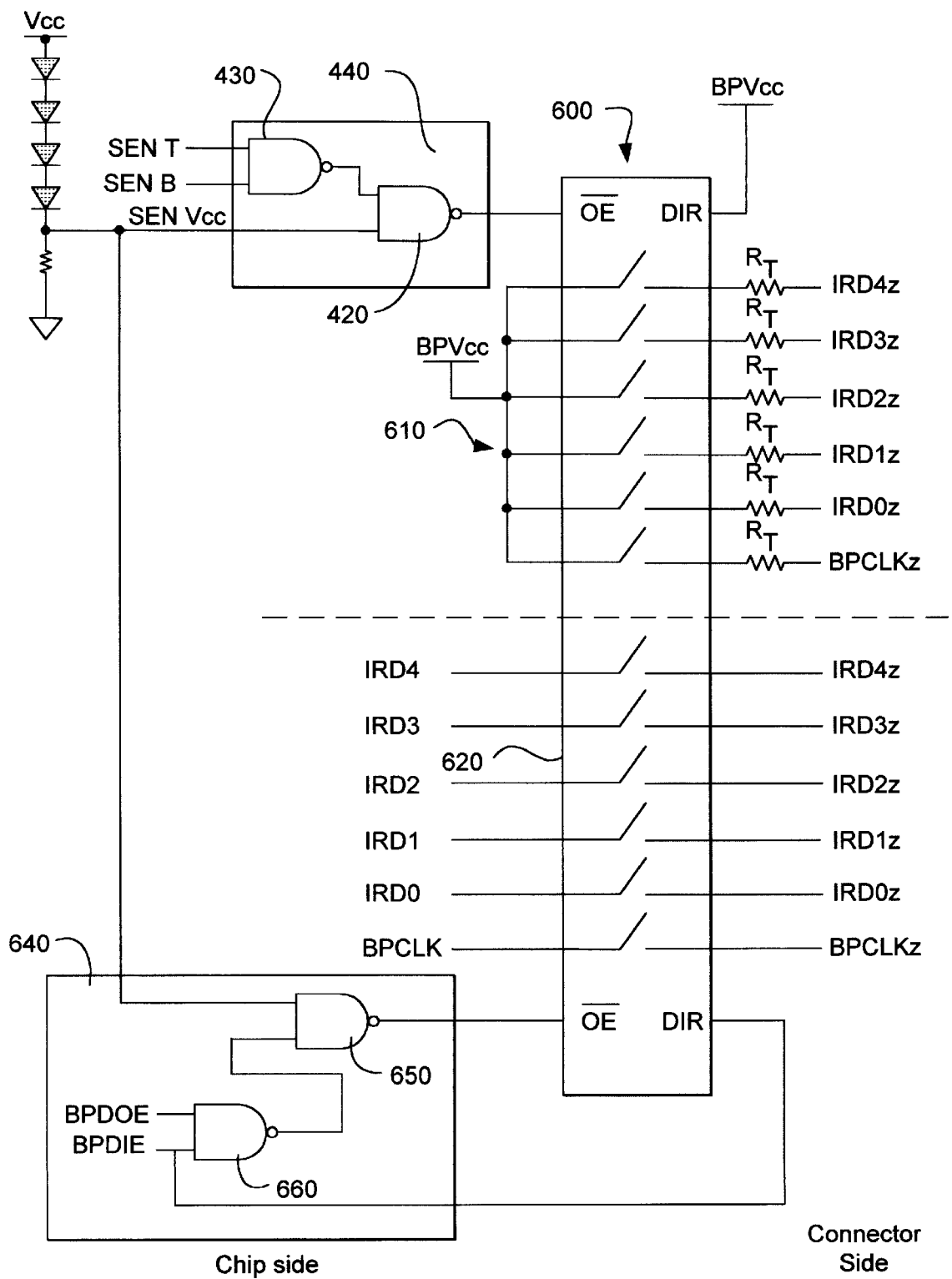
FIG. 6 illustrates an electrical schematic view of a circuit for evaluating the state of the given layer, optionally coupling each signal line to a termination resistor, and preventing a false SEN Vcc state reading where BPVcc leaks back into Vcc when the power to the given layer is off, representing an embodiment of the invention.

Referring now to FIG. 6, a more complete embodiment of the invention is depicted. A switch 600 includes an upper portion 610 and a lower portion 620. The upper portion 610 is functionally separate from the lower portion 620, as represented by the horizontal dashed line.

Still referring to FIG. 6, a first voltage source BPVcc can be coupled to connector contacts IRD[0–4]Z and BPCLKZ through the termination resistances $R_T$ by closure of the upper portion 610 of the switch 600. The upper portion 610 of the switch 600 can be termed a first switch. The circuits that compose the upper portion 610 are closed when $\overline{OE}$ for the upper portion 610 is low. $\overline{OE}$ for the upper portion 610 will be low when the output from the first logic gate 420 is low. Of course, the output from first logic gate 420 will be low when both SENVcc is high and the output from the second logic gate 430 is high. The output from the second logic gate 430 will be high when either (or both) of SEN T and SEN B are low. With regard to the upper portion 610 of the switch 600, DIR (the direction control)=BPVcc and the direction of the signal is always from the chip side to connector side (input with regard to the backplane), provided that BPVcc is active. BPVcc will generally be active, even if Vcc is not active.

Still referring to FIG. 6, IRD[0–4] and BPCLK can be coupled to IRD[0–4]Z and BPCLKZ by closure of the lower portion 620 of the switch 600. The lower portion 620 of the switch 600 can be termed a second switch. The second switch is located between said plurality of connector contacts and a plurality of layer contacts. A second logic circuit 640 is coupled to the second switch. The second logic circuit 640 closes the second switch when the layer composed by the backplane connector is active and either backplane data input enabled or backplane data output enabled. In more detail, the circuits that compose the lower portion 620 are closed when $\overline{OE}$ for the lower portion 620 is low. $\overline{OE}$ for the lower portion 620 will be low when the output from a third logic gate 650 is low. Of course, the output from the third logic gate 650 will be low when both SEN Vcc is high and the output from a fourth logic gate 660 is high. The output from the fourth gate 660 will be high when one of BPDOE (backplane data output enable) or BPDIE (backplane data input enable) is logic low. When both BPDOE and BPDIE are logic high, the output from the fourth logic gate 660 will be low, the output from the third logic gate 650 will be low, and the circuits that compose the lower portion 620 will be closed. Normally BPDOE and BPDIE are high and the circuits that compose the lower portion 620 of switch 600 will be open. The fourth logic gate 660 uses negative logic. BPDOE and BPDIE are active low. With regard to the lower portion 620 of the switch 600, DIR (direction control)= BPDIE (backplane data input enable). The direction of the signal is from the chip side to the connector side when BPDOE is logic low. When BPDIE=0 and BPDOE=1, the backplane data will come in from the connector (e.g., IRD[0–4]Z) and go toward the chip side. Conversely, when BPDOE is logic low, the direction of the signal is from the connector side to the chip side. When BPDIE=0 and BPDOE=1, the connector signals, (e.g., IRD[0–4]Z) will drive the analog switch and go toward the chip side.

5. Explanation for the leakage from backplane.

Figure 7:
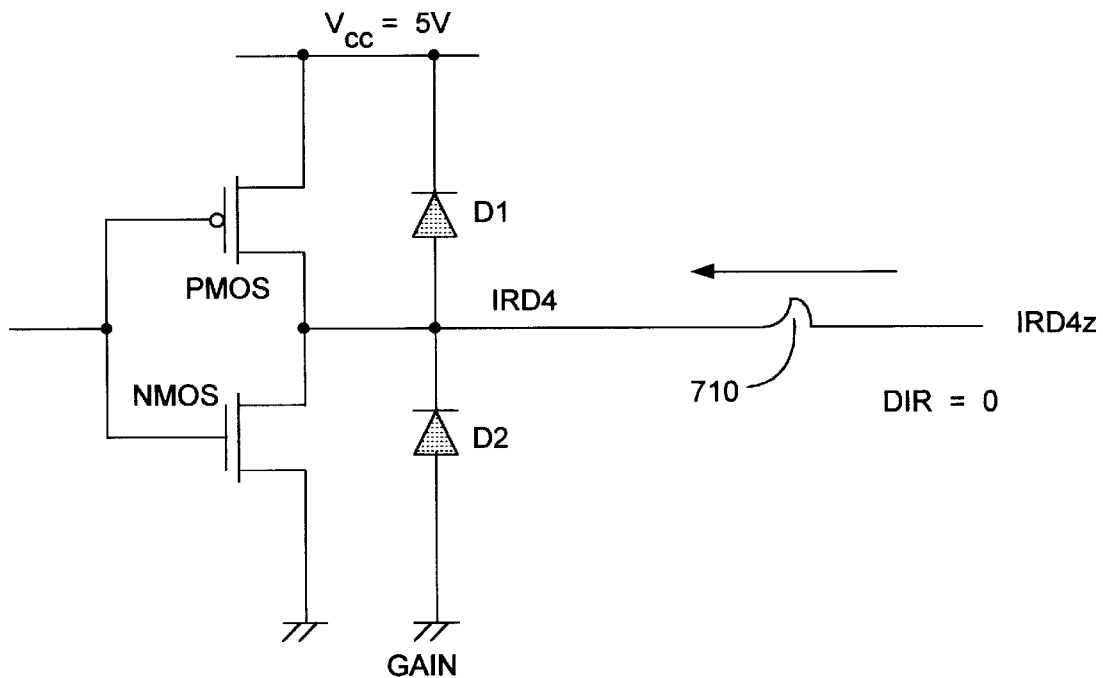
FIG. 7 illustrates an electrical schematic view of an output structure of a CMOS output driver, representing an embodiment of the invention.

Referring now to FIG. 7, the leakage of BPVcc to Vcc will be explained in more detail. A switch 710 is on and a backplane signal, for example, IRD4Z is driving into the chip through the IRD4 pin. The output structure of any CMOS output driven includes a PMOS and an NMOS. There exist a parasitic PN diode D1 from the output pin to Vcc and a parasitic PN diode D2 from output pin to ground.

Still referring to FIG. 7, when Vcc (chip power) is on, Vcc can be 5 v, for example, and both of D1 and D2 are off. However, when Vcc is off, D1 is turned on because it becomes forward-biased due to BPVcc leaking through the switch 710. Assuming the voltage drop across D1 is approximately 0.7 v, $$Vcc=IRD4Z-D1\approx 3.3-D1\approx 2.6 \text{ v}.$$

If SEN Vcc is taken from this Vcc, SEN Vcc will stay at 2.6 v, which is logic high for NAND gates. This, in turn, causes $\overline{OE}$ to stay low, i.e., the analog switch device will never be turned off.

Referring again to FIG. 5, if the plurality of diodes 510 are added in series with Vcc to provide fixed voltage drops, $$SEN\ Vcc=Vcc-(4\times V_D)=2.6-(4\times 0.6)=0.2 \text{ v}.$$

0.2 v is logic low for NAND gates. This ensures SEN Vcc is low when the chip power is off. On the other hand, when the chip power is on, $$SEN\ Vcc=Vcc-(4\times V_D)=5.0-(4\times 0.6)=2.6 \text{ v}.$$

This is definitely a high (logic 1) for NAND gate.

Figure 8:
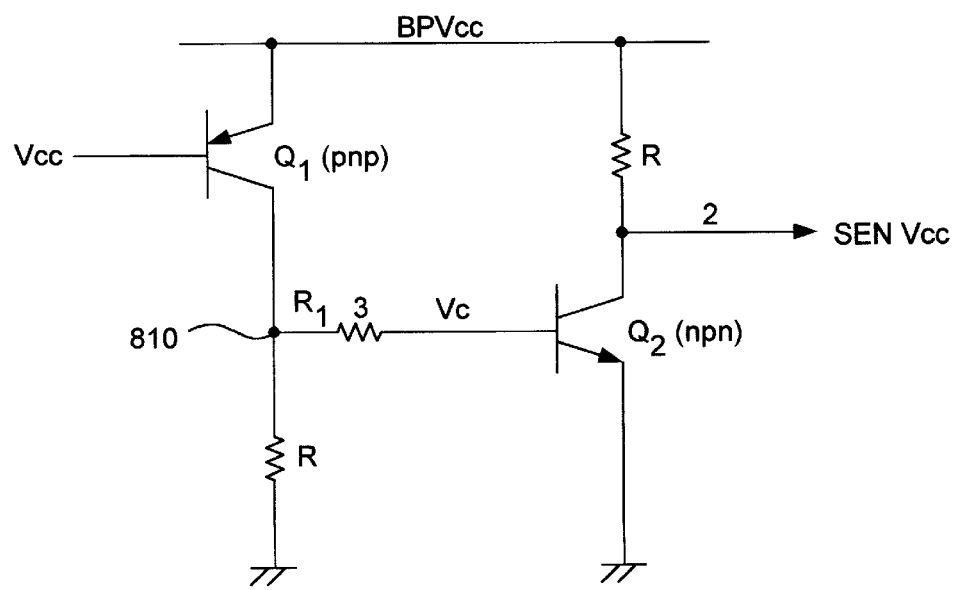
FIG. 8 illustrates an electrical schematic view of another circuit for preventing a false SEN Vcc state reading where BPVcc leaks back into Vcc when the power to the given layer is off, representing an embodiment of the invention.

Referring now to FIG. 8, an alternative to the transforming circuit shown in FIG. 5 is depicted. This circuit consists of two transistors and three resistors. BPVcc is connected to ground via a pnp transistor Q1, and a first resistor $R_1$. The base of the pnp transistor Q1 is controlled by Vcc. BPVcc is also connected to ground via a second resistor $R_2$ and an npn transistor Q2. The base of the npn transistor Q2 is connected to a node 810 via a third resistor $R_3$.

The operation of the circuit depicted in FIG. 8 will now be described. The first stage is to detect how high is Vcc compared with BPVcc. When the chip power is on, Vcc=5 v and BPVcc=3.3 v. Therefore, the pnp transistor Q1 will be off because Vcc>BPVcc and the npn transistor Q2 will also be off because $V_B=0$. The output of the second stage, the SEN Vcc signal, is equal to BPVcc (e.g., 3.3 v). This is logic high for a NAND gate.

Still referring to FIG. 8, when the chip power is off, Vcc=2.6 at the beginning, for reasons explained above, and BPVcc=3.3 v. Therefore, the pnp transistor Q1 will be turned on and $V_B$ will go up to approximately 0.7 v so as to turn on the npn transistor Q2. As a result of npn transistor Q2 being switched on, SEN Vcc will go down to approximately 0.2 v which is logic low for the NAND gate. The circuit depicted in FIG. 8 can also be used when Vcc is normally 3.3 v (i.e., when the entire system (e.g., stack) is 3.3 v). The backplane, the backplane connector, and associated methods will be applicable where the entire system is 3.3 v, or any other voltage.

Practical Applications of the Invention

A practical application of the invention that has value within the technological arts is coupling stackable networking hubs. Further, the invention is also useful in conjunction with arrays of sensors (such as are used for the purpose of alarm systems), or the like. There are virtually innumerable uses for the invention, all of which need not be detailed here.

Advantages of the Invention

A stackable networking hub, representing an embodiment of the invention, can be cost effective and advantageous for at least the following reasons. The invention is an economical solution because it utilizes a relatively small number of simple components. The invention includes a support feature that provides continuation of data flow even when some layers are not powered up.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be assembled in the disclosed configuration, but could be assembled in virtually any configuration. Further, although the termination coupling circuits are described herein as a physically separate module, it will be manifest that the termination coupling circuits may be integrated into the apparatus with which they are associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. A backplane connector, comprising:
   a first voltage source;
   a plurality of connector contacts;
   a plurality of termination resistors, a first end of said plurality of termination resistors being coupled to said plurality of connector contacts;
   a first switch located between said first voltage source and a second end of said plurality of termination resistors;
   a first logic circuit coupled to said first switch, said first logic circuit closing said first switch when a layer composed by said backplane connector is both i) active and ii) either a top layer in a stack composed by said layer or a bottom layer in said stack.

2. The backplane connector of claim 1, wherein said first voltage source includes a backplane voltage source.

3. The backplane connector of claim 1, wherein each of said plurality of connector contacts includes an input/output pin.

4. The backplane connector of claim 1, wherein said first logic circuit includes a first logic gate and a second logic gate, said first logic gate having i) an output coupled to said first switch, ii) a first input that carries a signal representing an activity state of said layer, and iii) a second input that carries an output signal from said second logic gate, said second logic gate including i) a first input that carries a signal representing a top layer state of said layer and ii) a second input that carries a signal representing a bottom layer state of said layer.

5. The backplane connector of claim 4, wherein said output signal from said second logic gate is logic high when either said signal representing said top layer state of said layer is logic low or said signal representing said bottom layer state of said layer is logic low.

6. The backplane connector of claim 5, wherein said first switch is closed when said output coupled to said first switch is logic low.

7. The backplane connector of claim 6, wherein said output coupled to said first switch is logic low when said signal representing said activity state of said layer is logic high and said output signal from said second logic gate is logic high.

8. The backplane connector of claim 4, further comprising a signal transformer coupled to said first input that carries said signal representing said activity state of said layer.

9. The backplane connector of claim 8, wherein said signal transformer includes a series of diodes and a signal transformer resistor, a first end of said series of diodes being coupled to a second voltage source, a second end of said series of diodes being coupled to said first input that carries said signal representing said activity state of said layer, a first end of said signal transformer resistor being coupled to said second end of said series of diodes, and a second end of said signal transformer resistor being coupled to ground.

10. The backplane connector of claim 8, wherein said signal transformer includes
    a pnp transistor, an emitter of said pnp transistor being coupled to the first voltage source and a base of said pnp transistor being coupled to a second voltage source,
    a first resistor, a first end of said first resistor being coupled to a collector of said pnp transistor and a second end of said first resistor being coupled to ground,
    a second resistor, a first end of said second resistor being coupled to said first voltage source,
    a third resistor, a first end of said third resistor being coupled to said collector of said pnp transistor, and
    an npn transistor, a collector of said npn transistor being coupled to a second end of said second resistor, an emitter of said npn transistor being coupled to ground and a base of said npn transistor being coupled to a second end of said third resistor.

11. The backplane connector of claim 1, further comprising
    a second switch located between said plurality of connector contacts and a plurality of layer contacts
    a second logic circuit coupled to said second switch, said second logic circuit closing said second switch when said layer composed by said backplane connector is i) active and ii) either backplane data input enabled or backplane data output enabled.

12. The backplane connector of claim 11, wherein said second logic circuit includes a third logic gate and a fourth logic gate, said third logic gate having i) an output coupled to said second switch, ii) a first input that carries said signal representing said activity state of said layer, and iii) a second input that carries an output signal from said fourth logic gate, said fourth logic gate including i) a first input that carries a signal represeting a backplane data output enable state of said connector and ii) a second input that carries a signal representing a backplane data input state of said connector.

13. The backplane connector of claim 12, wherein said output signal from said fourth logic gate is logic high when either said signal representing said backplane data output enable state of said connector is logic high or said signal representing said backplane data input enable state of said connector is logic high.

14. The backplane connector of claim 13, wherein said second switch is closed when said output coupled to said second switch is logic low.

15. The backplane connector of claim 14, wherein said output coupled to said second switch is logic low when said signal representing said activity state of said layer is logic high and said output signal from said fourth logic gate is logic high.

16. The backplane connector of claim 11, wherein said first logic circuit includes a first logic gate and a second logic gate, said first logic gate having i) an output coupled to said first switch, ii) a first input that carries a signal representing an activity state of said layer, and iii) a second input that carries an output signal from said second logic gate, said second logic gate including i) a first input that carries a signal representing a top layer state of said layer and ii) a second input that carries a signal representing a bottom layer state of said layer.

17. The backplane connector of claim 11, further comprising a signal transformer coupled to said first input that carries a signal representing an activity state of said layer.

18. The backplane connector of claim 17, wherein said signal transformer includes a series of diodes and a signal transformer resistor, a first end of said series of diodes being coupled to a second voltage source, a second end of said series of diodes being coupled to said first input that carries said signal representing said activity state of said layer, a first end of said signal transformer resistor being coupled to said second end of said series of diodes, and a second end of said signal transformer resistor being coupled to ground.

19. The backplane connector of claim 17, wherein said signal transformer includes a pnp transistor, an emitter of said pnp transistor being coupled to the first voltage source and a base of said pnp transistor being coupled to a second voltage source, a first resistor, a first end of said first resistor being coupled to a collector of said pnp transistor and a second end of said first resistor being coupled to ground, a second resistor, a first end of said second resistor being coupled to said first voltage source, a third resistor, a first end of said third resistor being coupled to said collector of said pnp transistor, and an npn transistor, a collector of said npn transistor being coupled to a second end of said second resistor, an emitter of said npn transistor being coupled to ground and a base of said npn transistor being coupled to a second end of said third resistor.

20. A method of terminating a backplane defined by electrical interconnections between a plurality of layers, said method comprising:

detecting a top layer among said plurality of layers, said top layer including a top backplane connector having a plurality of connector contacts; and coupling a plurality of terminating resistors to said plurality of connector contacts.

21. The method of claim 20, further comprising powering down at least one of said plurality of layers.

* * * * *

UNITED STATES PATENT AND TRADEMARK OFFICE
CERTIFICATE OF CORRECTION

PATENT NO.   : 6,087,848
DATED        : July 11, 200
INVENTOR(S)  : Jung-Chen Lin and Lawrence W. Mo It is certified that error appears on the above-identified patent and that said Letters Patent are hereby corrected as shown below:

Title page item [30]
under Inventors: delete "Lawerence W. Mo" and replace with -- Lawrence W. Mo--; and Page 10, line 42, claim 12: delete "represeting" and replace with --representing--.

Signed and Sealed this

Seventeenth Day of April, 2001

Attest:

NICHOLAS P. GODICI

Attesting Officer     Acting Director of the United States Patent and Trademark Office